(12) United States Patent
Coppola

(10) Patent No.: US 11,491,749 B2
(45) Date of Patent: Nov. 8, 2022

(54) METHODS FOR FORMING COMPOSITE COMPONENTS WITH SEALED BI-MATERIAL INTERFACES

(71) Applicant: GM GLOBAL TECHNOLOGY OPERATIONS LLC, Detroit, MI (US)

(72) Inventor: Anthony M. Coppola, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 286 days.

(21) Appl. No.: 16/701,640

(22) Filed: Dec. 3, 2019

(65) Prior Publication Data

US 2021/0162689 A1 Jun. 3, 2021

(51) Int. Cl.
*B29C 70/68* (2006.01)
*B22D 19/00* (2006.01)

(52) U.S. Cl.
CPC .......... *B29C 70/68* (2013.01); *B22D 19/0072* (2013.01)

(58) Field of Classification Search
CPC .................................................... B29C 70/68
(Continued)

(56) References Cited

U.S. PATENT DOCUMENTS 5,725,940 A  3/1998 Sakai et al.
5,942,070 A * 8/1999 Park ...................... B29C 70/342
                                                        264/135
(Continued)

FOREIGN PATENT DOCUMENTS

CN  1246824 A  3/2000
CN  107672196 A  2/2018
(Continued)

OTHER PUBLICATIONS

Yang, E.; Wang, J.; Jiang, F.; Si, F. "Research Progress of the Expense of the Template as the Main Route of Preparation of Porous Ceramic," College of Mechanical & Electrical Engineeing, Xi'an Polytechnic University, Aug. 2015, pp. 5-8, vol. 34 No. 8, School of Materials, Northwestern Polytechnical University, Xi'an.
(Continued)

Primary Examiner — Edmund H Lee
(74) Attorney, Agent, or Firm — Quinn IP Law

(57) ABSTRACT

Methods for forming composite components with sealed bi-material interfaces include applying a sacrificial material to a surface of a substrate, over-molding the substrate and the sacrificial material with an over-molding material such that the over-molding material covers at least a portion of the sacrificial material and at least one surface of the substrate, removing the sacrificial material by deflagration to form a composite component with a channel between the substrate and the over-molding material, introducing an uncured sealant into the channel, and curing the sealant to form a sealed composite component. The method can further include removing a portion of the sealant prior to the sealant fully curing. The sealed composite component can include a passage, encircled by the channel, extending between the substrate and the over-molding material. The substrate can be a metal, a polymer, a polymer composite, a ceramic, or a continuous fiber composite material.

20 Claims, 4 Drawing Sheets

(58) Field of Classification Search
USPC .................... 264/313, 255, 250, 267
See application file for complete search history.

(56) References Cited

U.S. PATENT DOCUMENTS

| | | | |
|---|---|---|---|
| 6,274,072 B1* | 8/2001 | Naritomi | B29C 45/4457 |
| | | | 264/250 |
| 8,877,110 B2* | 11/2014 | Molinari | A63B 37/0003 |
| | | | 264/267 |
| 9,308,726 B2* | 4/2016 | Hays | B41J 2/1623 |
| 9,976,815 B1* | 5/2018 | Roper | B22F 7/004 |
| 10,155,547 B1 | 12/2018 | Coppola et al. | |
| 2012/0140340 A1 | 6/2012 | Duparre et al. | |
| 2012/0315429 A1 | 12/2012 | Stamp et al. | |
| 2013/0215197 A1* | 8/2013 | Hays | B41J 2/14 |
| | | | 29/890.1 |
| 2015/0140283 A1 | 5/2015 | White et al. | |
| 2015/0363598 A1* | 12/2015 | Xu | G06F 21/563 |
| | | | 726/23 |
| 2017/0106605 A1 | 4/2017 | Ng et al. | |
| 2019/0168473 A1* | 6/2019 | Ellison | B33Y 80/00 |
| 2020/0016803 A1* | 1/2020 | Coppola | B29C 45/44 |
| 2021/0054747 A1* | 2/2021 | Spangler | F01D 5/141 |

FOREIGN PATENT DOCUMENTS

| | | |
|---|---|---|
| CN | 109070413 A | 12/2018 |
| DE | 102011100222 A1 | 11/2012 |
| DE | 102019111729 A1 | 11/2019 |
| JP | H0387302 A | 4/1991 |
| WO | 2011130881 A1 | 10/2011 |

OTHER PUBLICATIONS

GM Global Technology Operations; U.S. Appl. No. 15/981,190, filed May 16, 2018.

GM Global Technology Operations; U.S. Appl. No. 15/989,988, filed May 25, 2018.

GM Global Technology Operations; U.S. Appl. No. 16/533,176, filed Aug. 6, 2019.

* cited by examiner

METHODS FOR FORMING COMPOSITE COMPONENTS WITH SEALED BI-MATERIAL INTERFACES

BACKGROUND

Over-molded components are formed by casting, curing, or otherwise molding an over-molding onto a substrate to form a composite component. Such over-molded components are used in a variety of applications, including automotive applications. For many applications, a seal or gasket disposed between the substrate and the over-molding is required. Some gaskets are formed-in-place during over-molding. For example, FIG. 1 illustrates a method 10 for an over-molding process, wherein a gasket material or sealant 3 is applied 11 to a substrate 1, the sealant 3 and substrate 1 are prepared 12 for over-molding 13 (e.g., heated and/or placed in a mold), an over-molding material 2 is over-molded 13 over at least a portion of both the sealant 3 and the substrate 1 to form a composite component 4 with a formed-in-place gasket 6, and the composite component 4 is cured or otherwise solidified 14. As shown, formed-in-place gaskets 6 may provide inadequate sealing between the substrate 1 and the over-molding material 2 because the sealant 3 may expand (from its originally applied 11 size 3* during preparation 12 (e.g., due to high temperatures during over-molding 13) and subsequently shrink during curing 14. Additionally, a gap 5 may sometimes form between the substrate 1 and the over-molding material 2 due to a difference in the respective coefficients of linear thermal expansion (CLTE) of the substrate 1 and the over-molding material 2.

SUMMARY

Provided are methods for forming composite components with sealed bi-material interfaces. The methods can include applying a sacrificial material to a surface of a substrate, over-molding the substrate and the sacrificial material with an over-molding material such that the over-molding material covers at least a portion of the sacrificial material and at least one surface of the substrate, removing the sacrificial material by deflagration to form a composite component with a channel between the substrate and the over-molding material, introducing an uncured sealant into the channel, and curing the sealant to form a sealed composite component. A gap can form between the substrate and the over-molding material during or after the over-molding material cures and introducing a sealant into the channel can further include introducing the sealant into a least a portion of the gap. The substrate can be a first material having a first coefficient of linear thermal expansion (CLTE) and the over-molding material can have a second CLTE which is different from the first CLTE. The second CLTE can be higher than the first CLTE. The second CLTE can be at least 10% higher or lower than the first CLTE. The method can further include, subsequent to introducing sealant into the channel and prior to the sealant fully curing, removing a portion of the sealant introduced into the channel via pressurized gas. The sealed composite component can include a passage extending between the substrate and the over-molding material, and the channel at least partially encircles a cross-section of the passage. The substrate can be one or more of a metal, a polymer, a polymer composite, a ceramic, or a continuous fiber composite material. The over-molding material can be a cast metal. The over-molding material can be a polymer, a polymer composite, or a continuous fiber composite material. The over-molding material can be a polymeric material. The sealant can include one or more silicones, one or more polyurethanes, one or more acrylates, one or more epoxies, and combinations thereof. The substrate can be a metal and the over-molding material can be a polymeric material. The substrate can be iron or steel and the over-molding material can be cast aluminum or cast magnesium. The substrate can be a ceramic material and the over-molding material can be a polymeric material. The substrate can be a cylinder liner and the over-molding material can be an engine block.

Methods for forming composite components with sealed bi-material interfaces provided. The methods can include applying a sacrificial material to a surface of a metal automotive component case, over-molding the substrate and the sacrificial material with an over-molding material such that the over-molding material covers at least a portion of the sacrificial material and at least one surface of the substrate, removing the sacrificial material by deflagration to form a composite component with a channel between the substrate and the over-molding material, introducing an uncured sealant into the channel, and curing the sealant to form a sealed composite component. The over-molding material can be a polymer, a polymer composite, or a continuous fiber composite material. The sealed composite component can further include one or more cooling passages extending between the metal automotive component case and the over-molding material. The automotive component case can be a drive unit case. The automotive component case can be a stator housing.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. As used herein, "wt. %" refers to a percent by weight, and "v. %" refers to a percent by volume.

Provided herein are methods for forming a composite component comprising a sealed bi-material interface. Deflagration processes can be used to form a channel at the bi-material interface into which a sealant is introduced. The methods provided herein advantageously do not require precise matching of material properties to form a suitably sealed bi-material interface.

Figure 1:
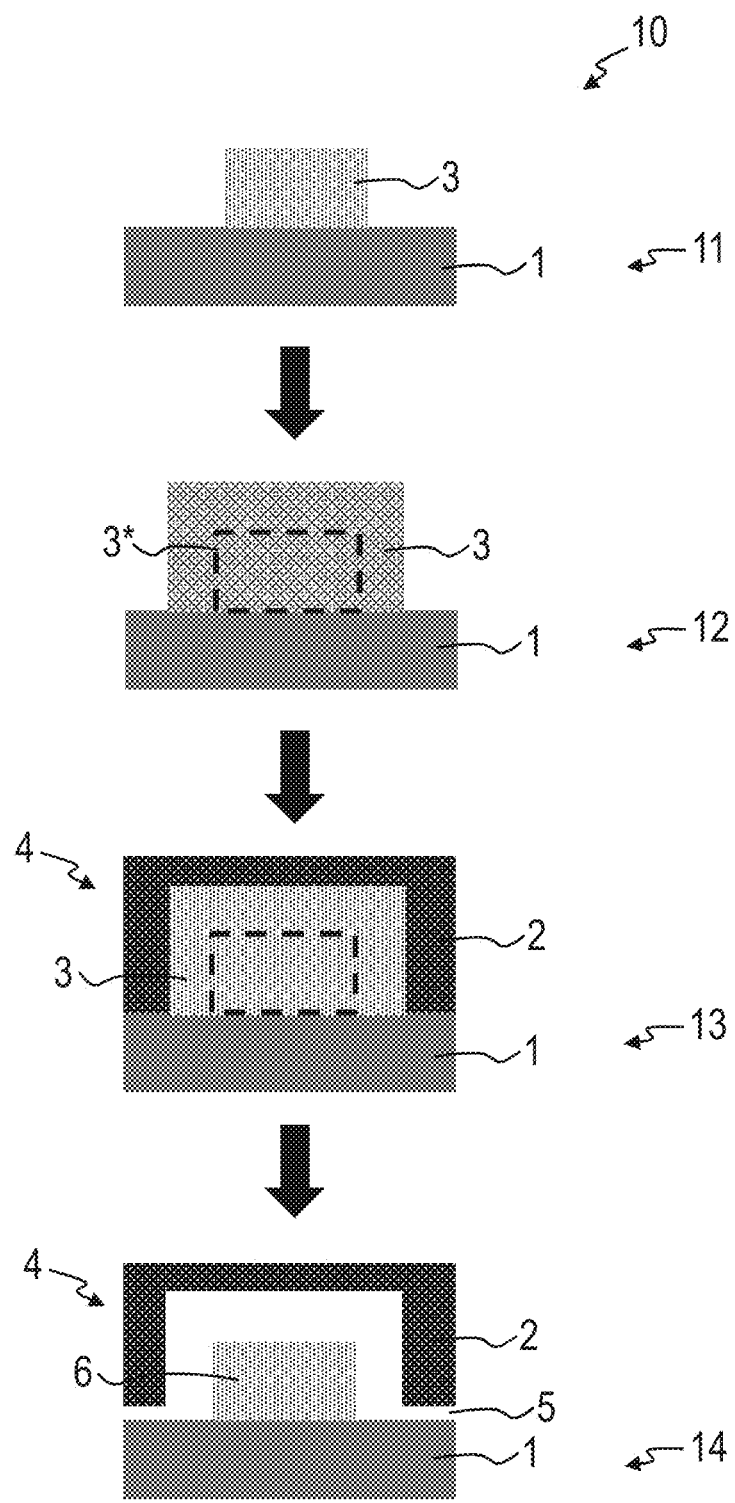
FIG. 1 illustrates a schematic view of an over-molding process, according to one or more embodiments.
Figure 2:
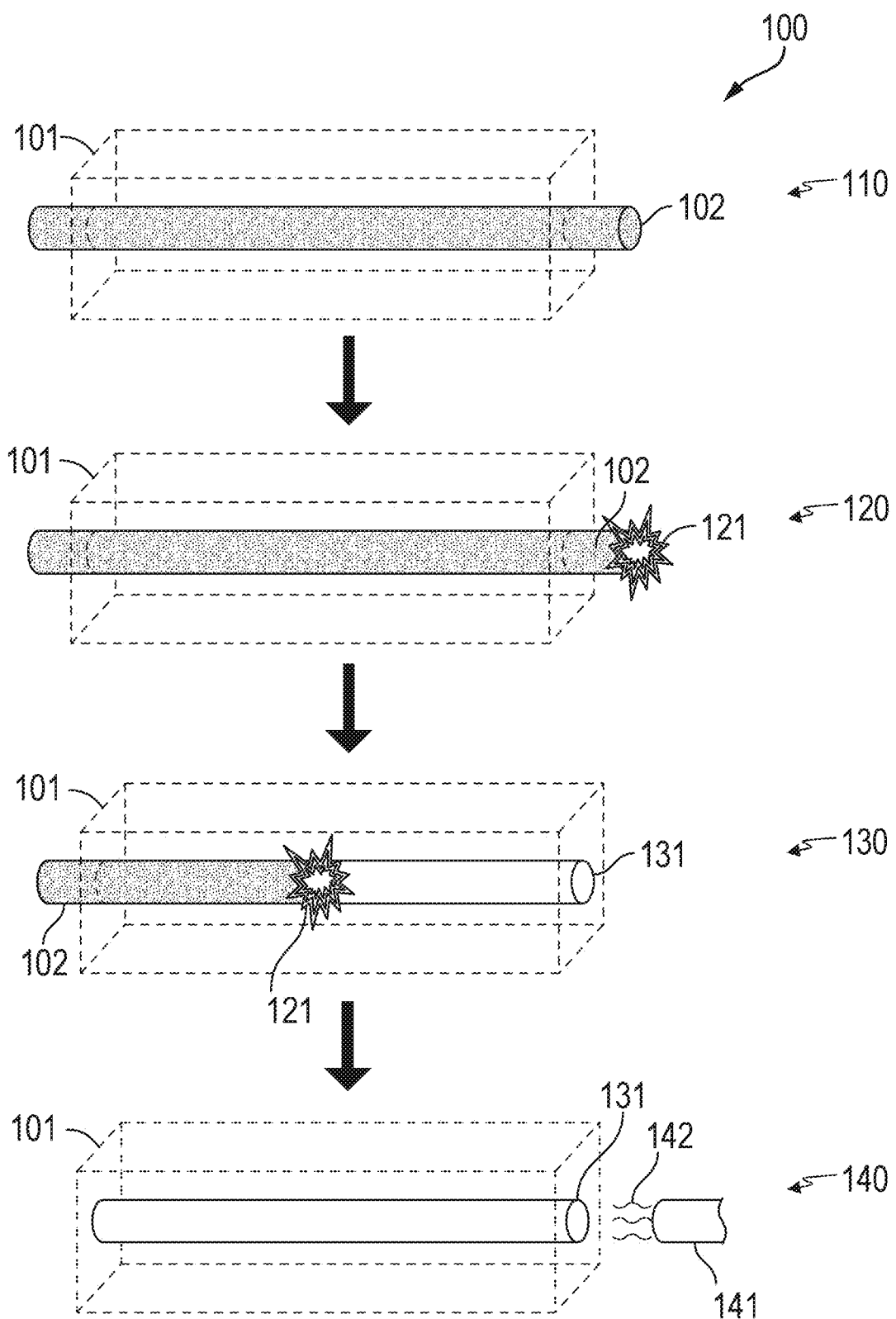
FIG. 2 illustrates a schematic view of a method for forming channels within a substrate, according to one or more embodiments.

FIG. 2 illustrates a method 100 for forming channels 131 within a substrate 101 using deflagration of a sacrificial component 102. As used herein, "deflagration" refers to controlled combustion without extreme detonation. Method 100 comprises molding 110 the sacrificial component 102 directly into the substrate 101, igniting 120 the sacrificial component 102 (e.g., using a flame or other heat or combustion inciter to cause an ignition 121) to cause deflagration 130 of the sacrificial component 102. Deflagration 130 converts the solid sacrificial material into gaseous and fine powder byproducts, thereby forming a channel 131 in the substrate 101. The sacrificial component 102 can be cylindrical in order to form the channel 131 with a cylindrical cross section, or can have other shapes, such as triangular, elliptical, square, etc. as desired. The sacrificial component 102 can have an unbranched or networked geometry to define the geometry of the desired resulting channel(s) 131. Method 100 can optionally further include cleaning 140 the channel 131 to remove byproducts of the deflagration of the sacrificial component 102. Cleaning 140 can comprise introducing a fluid 142 via a fluid source 141 into the channel 131 in some embodiments. The fluid 142 can be a liquid (e.g., water, organic solvents) and/or a gas (e.g., air).

Molding 110 generally comprises disposing the sacrificial component in a mold, filling the mold with liquid or uncured material (e.g., polymeric resin, uncured composite materials such as carbon fiber), and curing the material to form the substrate 101. Molding 110 the sacrificial component 102 directly into the substrate 101 can comprise partially molding 110 the sacrificial component 102 directly into the substrate 101 such that at least part of the sacrificial component 102 is disposed outside of the substrate 101 to provide an ignition 121 location. The substrate 101 can partially or wholly comprise a metal, a polymer, a polymer composite, or a continuous fiber composite material (e.g., carbon fiber, fiber glass), among others, and can be a dual-material substrate as will be discussed below.

Method 100 is particularly advantageous for forming channels 131 in substrates 101 which are heat sensitive (e.g., electronics). For example, method 100 can be used to manufacture vascular cooled potted electronics, an engine control unit or touch screen on an instrument, biomedical implants, battery enclosures and cooling fins, electric drive units, and vascular engines and motors, among others. Method 100 can be used to manufacture automotive and non-automotive components such as intake ports in polymer composite engine head assemblies, engine block water jackets, transmission casing oil galleries, composite chassis comprising localized hollow sections, polymer composite structural members comprising undercut sections, and composite (e.g., carbon fiber) suspension arms and bicycle frames.

Figures 3A, 3B:
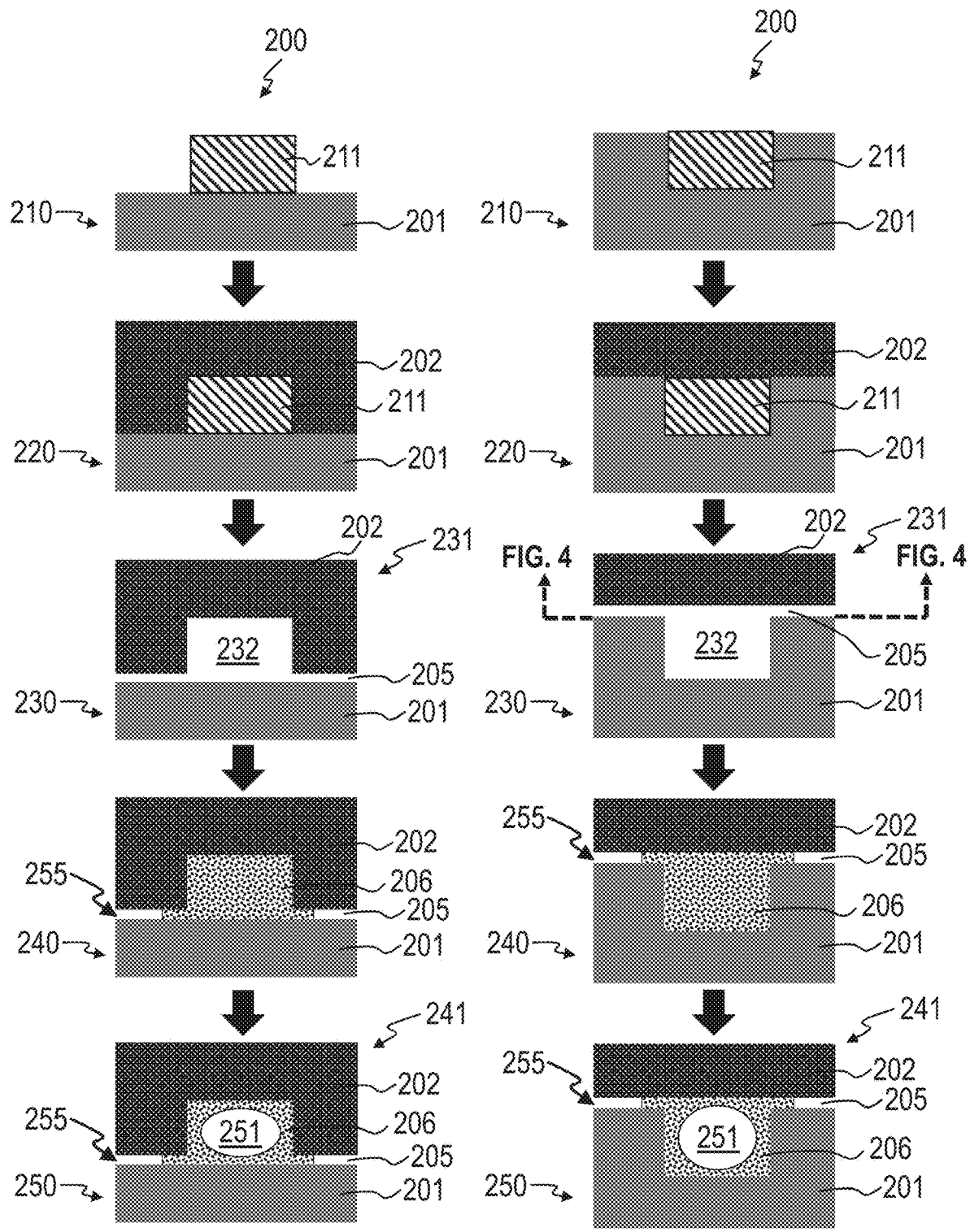
FIG. 3A illustrates a schematic view of a method for forming a composite component comprising a sealed bi-material interface, according to one or more embodiments.
FIG. 3B illustrates a schematic view of a method for forming a composite component comprising a sealed bi-material interface, according to one or more embodiments.

FIGS. 3A-B illustrate methods 200 for forming a composite component comprising a sealed bi-material interface. The method comprises applying 210 a sacrificial material 211 to a surface of a substrate 201, over-molding 220 the substrate 201 and the sacrificial material 211 with an over-molding material 202 such that the over-molding material 202 covers at least a portion of the sacrificial material 211 and at least a portion of one surface of the substrate 201; removing 230 the sacrificial material 211 by deflagration to form a composite component 231 with a channel 232 between the substrate 201 and the over-molding material 202, introducing 240 an uncured sealant 206 into the channel 232, and curing 250 the sealant to form a sealed composite component 241 with a bi-material sealed interface 255.

Over-molding 220 can include applying a material (e.g., over-molding material 202) and curing the material or partially curing material. In some embodiments the over-molding material 202 is fully cured when the sacrificial material 211 is removed 230 via deflagration. In other embodiments, the over-molding material 202 can be partially cured when the sacrificial material 211 is removed 230 via deflagration when deflagration of the sacrificial material 211 will not unsuitably interfere with subsequent curing of the over-molding material 202. In some embodiments the substrate 201 comprises a first material having a first coefficient of linear thermal expansion (CLTE) and the over-molding material 202 has a second CLTE which is different from the first CLTE. In some embodiments, the second CLTE is higher than the first CLTE. The second CLTE can be at least 10% higher than the first CLTE. In some embodiments, the first CLTE and second CLTE differ by such a degree that the change in temperature between the molding 220 temperature and the application temperature (i.e., a temperature at which the sealed composite component 241 will be used/operated) will cause the interfacial stress between the substrate 201 and the over-molding material 202 to exceed its ultimate strength and induce separation.

In some instances, wherein the first CLTE and second CLTE are sufficiently different, a gap 205 can form between the substrate 201 and the over-molding material 202 when the latter is at least partially cured. Accordingly introducing 240 an uncured sealant 206 into the channel 232 further includes introducing the sealant 206 into a least a portion of the gap 205. It should be noted that interfaces between substrates 201 and over-molding materials 202 which are mechanically interlocked may still leak unless chemically bonded together. Method 200 therefore provides flexibility in manufacturing composite components (e.g., sealed composite component 241) because the first CLTE of the substrate 201 and the second CLTE of the over-molding material 202 must not be perfectly matched to ensure proper sealing of the composite component because any gaps (e.g., gap 205) will be sealed, or the present of the sealant 206 in the channel 232 obviates the need to seal any such gaps.

Introducing 240 an uncured sealant 206 into the channel 232 can include filling or partially filling the channel 232. Sealants can include any gasket material with a generally low bulk modulus that is able to expand and compress. For example, the sealant can comprise materials such as chemically reactive silicones (e.g., room-temperature-vulcanizing silicone), polyurethanes, acrylates, and epoxies. Sealants can be foaming sealants (e.g., self-foaming polyurethanes, silicone foams) and generally emit gas (e.g., $CO_2$) as a biproduct of their reaction during introducing 240. For example, foaming polyurethane sealant can foam when contacted with water or air.

Particularly for embodiments wherein an expanding sealant 206 is utilized, method 200 can further optionally comprise, subsequent to introducing 240 sealant 206 into the channel 232 and prior to the sealant 206 fully curing 250, removing a portion of the sealant 206 introduced into the channel via pressurized gas. In some embodiments, removing a portion of the sealant 206 can comprise blowing pressured gas 251 such as air through the channel 232. Removing a portion of the sealant 206 can be necessary to provide sealant 206 room within the channel 232 to cure. Sealant materials, including those described above, are generally sufficiently sticky in an uncured state such that they adhere to the walls of channel 232 during removal.

Figure 4:
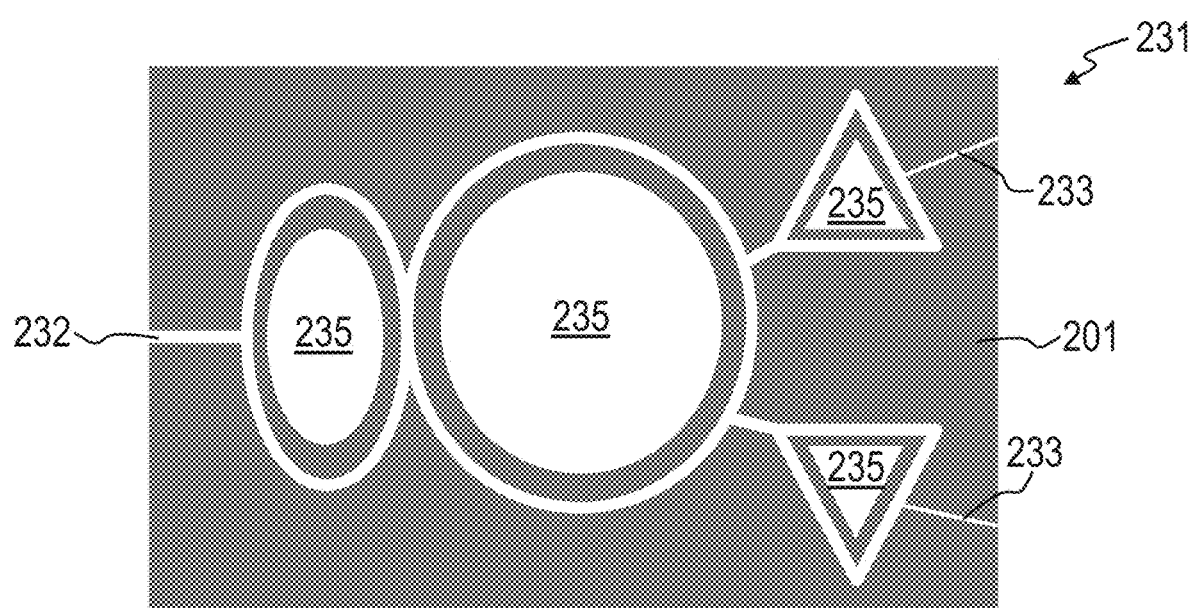
FIG. 4 illustrates a top view of a substrate integral to an unsealed composite component and used to form a sealed composite component, according to one or more embodiments.

Method 200 can be used to fabricate a variety of composite components with sealed bi-material interfaces 255. FIG. 4 illustrates a top view of a substrate 201 integral to an unsealed composite component 231 and used to form a sealed composite component 241. The substrate 201 can optionally further comprise one or more bleed passages 233 in fluid communication with the channel 232 which can be used to purge sealant. In some embodiments, the sealed composite component 241 can comprise one or more passages 235 extending between the substrate 201 and the over-molding material 202, and the channel 232 at least partially or fully encircles a cross-section of the passage(s) 235. The passage(s) 235 can be utilized to communicate coolant, for example. For example, the passage 235 can be a cooling channel in a composite engine block or power electronics module. The channel 232 is shown as formed in the over-molded material 202 in FIG. 3A and in the substrate 201 in FIG. 3B and FIG. 4, however the channel 232 can also be formed in both the over-molded material 202 and the substrate 201, in some embodiments. Similarly, FIG. 4 can also represent a channel formed in the over-molded material 202.

The substrate 201 can partially or wholly comprise a metal (e.g., aluminum, steel), a polymer (e.g., a thermosetting polymer, a thermoplastic polymer), a polymer composite, a continuous fiber composite material (e.g., carbon fiber, fiber glass), or crystalline and non-crystalline ceramics, among others. Suitable polymers can include thermoset and thermoplastic polymers, including polyamides, polyvinyl chloride, polystyrenes, natural rubbers, silicones, acrylates, polycarbonates, acrylonitrile butadiene styrene, polyethylene terephthalates, polybutylene terephthalates, epoxies, polyurethanes, polyesters, polyimides, polypropylenes, and phenolics (e.g., novolac phenolics, resole phenolics), among others. In some embodiments, the over-molding material can comprise a polymeric molding compound, which comprises one or more fillers imbedded in a polymer matrix. Suitable fillers include fibers (e.g., glass, carbon, basalt), ceramic particles (e.g., calcium carbonate, magnesium silicates, calcium silicates, metal oxy sulfates). In one embodiment, the over-molding material 202 comprises magnesium silicate and glass fiber fillers imbedded in a polypropylene matrix.

The over-molding material 202 can comprise a cast metal, a polymer such as those discussed above, a polymer composite, or a continuous fiber composite material (e.g., carbon fiber, fiber glass), among others. Suitable polymers can include epoxies, epoxy resins, polyurethanes, polyesters, polyimides, polypropylenes, thermosetting resins (e.g., phenolic molding compound), polypropylene molding compounds, or nylons. In some embodiments the over-molding material 202 can comprise a phenolic molding compound, an epoxy, or a polyamide.

In some embodiments, the substrate 201 comprises a metal and the over-molding material 202 comprises a phenolic molding compound, an epoxy, or a polyamide. In other embodiments, the substrate 201 comprises a metal (e.g., iron, steel) and the over-molding material 202 comprises a cast metal (e.g., aluminum, magnesium). For example, the substrate 201 can comprise an iron or steel cylinder liner and the over-molding material 202 can be a cast aluminum engine block. In other embodiments, the substrate 201 comprises a ceramic material (e.g., glass, alumina, silicon nitride, silicon carbide, lead zirconate titanate, boron nitride, zinc oxide) and the over-molding material 202 comprises a polymeric material. For example, an epoxy material can be over-molded 220 onto a onto a substrate which is an electronic component (e.g., a transistor power module). The substrate 201 can comprise an engine block. In some embodiments, the substrate 201 can comprise a metal automotive component case and the over-molding material 202 comprises a polymer, a polymer composite, or a continuous fiber composite material. The metal automotive component case and the over-molding material 202 can comprise one or more cooling passages extending therebetween. The metal automotive component case can be a drive unit case configured to house a motor and a gearset. The metal automotive component case can be a stator housing.

The composition of the sacrificial material 211 is tailored to provide a burn characteristic which minimizes heat transfer to the substrate 201 or the over-molding material 202 during removal 230 of the sacrificial material 211 by deflagration yet provide a thermal energy sufficient to maintain a suitable burn rate. The deflagration products are ideally easy to remove, such as fine powdered and large volumes of gaseous species. The sacrificial material 211 is further self-oxidizing to burn in a small diameter along long channels, resistant to molding pressures (e.g., pressures during over-molding 220), shelf stable, and stable during manufacturing (i.e., the ignition temperature is greater than the manufacturing or processing temperature). The term "ignition temperature" means the lowest temperature at which a body of a combustible material (e.g., sacrificial material 211) will ignite, when engaged with an ignition source. The sacrificial material 211 is generally over-molded 220 directly to the substrate 201 at a processing temperature that is less than the flash point of the combustible material to avoid deflagration during the manufacturing process. The term "processing temperature" means a temperature required to perform a manufacturing operation, such as molding or casting. For example, the processing temperature can be the melting temperature of the material forming the substrate 201 (e.g., the melting temperature of a polymeric resin forming the substrate 201).

In some embodiments the sacrificial component 102 can be formed using an additive manufacturing process, particularly when a sacrificial component with a complex geometry is required. Accordingly, substrates 101 with channels 131 having complex shapes can be created. The term "additive manufacturing process" refers a process in which a 3D object is built by adding layer-upon-layer of material. 3D printing process is a kind of additive manufacturing process. In the case of 3D printing, a 3D Computer Aided Design (CAD) model, or the like, can read by a computer, and the computer can command a 3D printer to add successive layers of material to create a 3D object that corresponds to the 3D CAD model.

In some embodiments, the sacrificial material 211 can comprise one or more of black powder (i.e., a mixture of sulfur, charcoal, and potassium nitrate), single base gun powders (e.g., particulate nitrocellulose), double base gun powders (e.g., nitrocellulose and nitroglycerin), triple base gun powders (e.g., nitrocellulose, nitroglycerin or diethylene glycol dinitrate, and nitroguanidine), and pentaerythritol tetranitrate. In such embodiments, the sacrificial material 211 can further comprise non-combustible filler materials to tune speed and heat generation. Suitable non-combustible materials include, but are not limited to, glass particles, beads, and/or bubbles formed from glass, ceramic, silica, or calcium carbonate, for example. In such embodiments, the sacrificial material 211 can further comprise a protective shell. The protective shell can comprise a braided polymeric or fibrous material (e.g., glass fiber, aramid fiber, carbon fiber, and/or natural fiber) infused with an infusion material such as a polymer, wax, oil, or a combination thereof.

In other embodiments, the sacrificial material 211 can comprise one or more polymers (e.g., polyesters, polyamides, polyurethanes, polyacrylates) with nitroester, nitro, azido, or nitramine functional groups. Some specific examples of energetic binders include glycidyl azide, pentaerythritol tetranitrate, nitrocellulose, pyrocellulose, poly(vinyl nitrate), polynitrophenylene, nitroamine, and poly(phosphzenes).

In other embodiments, the sacrificial material 211 can comprise one or more oxidizing agents imbedded in a combustible polymeric matrix, and optionally further comprises one or more additives. The polymeric matrix can comprise one or more thermosetting polymers, one or more thermoplastic polymers, and combinations thereof, and acts as a binder for the one or more oxidizing agents and optional additives. The one or more thermosetting polymers can include epoxies, polyurethanes, furans, melamines, polyimides, polyesters, phenolics, polybutadienes, benzoxazines, cyanate esters, vinyl esters, urea-formaldehydes, polyurea, bismaleimides, and elastomers, for example. The one or more thermoplastic polymers can include polypropylenes, polyethylenes, ABS, acrylics, polylactic acids, polybenzimidazole, polycarbonate, polyether sulfone, polyoxymethylene, polyetherether ketone, polyetherimide, polyethylene, polyphenylene oxide, polyphenylene sulfide, polystyrene, and polyvinyl chloride, for example.

The one or more oxidizing agents can comprise chlorates (e.g., potassium chlorate), perchlorates (e.g., ammonium perchlorate, potassium perchlorate), nitrates (e.g., ammonium nitrate, guanidine nitrate, potassium nitrate, strontium nitrate, sodium nitrate, barium nitrate), dichromates (e.g., potassium dichromate, ammonium dichromate), nitramides (e.g., ammonium dinitramide), and sulfates (e.g., strontium sulfate, sodium sulfate, barium sulfate), for example. In some embodiments, the one or oxidizing agents can have a micro-scale average particle size, for example about 1 $\mu$m to about 500 $\mu$m, or about 10 $\mu$m to about 100 $\mu$m. For example, the polymeric matrix can comprise about 25 wt. % to about 60 wt. %, or about 15 wt. % to about 40 wt. % of the sacrificial component.

The one or more additives imbedded within the polymeric matrix can include fuels, catalysts, energetic binders, burn rate suppressants, and non-combustible fillers, for example. Fuels can include unoxidized metal powders (e.g., aluminum powder, magnesium powder) and/or flammable gas-filled polymeric bubbles. The unoxidized metal powders can have a micro-scale average particle size (e.g., about 1 $\mu$m to about 500 $\mu$m, or about 10 $\mu$m to about 100 $\mu$m). The flammable gas-filled polymeric bubbles can comprise a polymeric shell (e.g., thermoplastic polymers such as polyester, polyurethane, polystyrene, polyvinyl chloride) encasing a flammable gas (e.g., pentane, butane, dichloroethylene, methylpentane).

Catalysts can include one or more metallocenes (e.g., ferrocene, catocene), and metal oxide particles (e.g., iron oxides, copper oxides, chromium oxides, manganese oxides). Energetic binders can include one or more polymers (e.g., polyesters, polyamides, polyurethanes, polyacrylates) with nitroester, nitro, azido, or nitramine functional groups. Some specific examples of energetic binders, as discussed above, include glycidyl azide, pentaerythritol tetranitrate, nitrocellulose, pyrocellulose, poly(vinyl nitrate), polynitrophenylene, nitroamine, and poly(phosphzenes). Burn rate suppressants can include one or more of oxamide, ammonium sulphate, calcium carbonate, calcium phosphate, and ammonium chloride. Non-combustible fillers can also include hollow bubbles, for example bubbles with a glass, ceramic, or high limiting oxygen index polymeric shell. Non-combustible fillers can also include inert particles, such as ceramic (e.g., silica, alumina) or calcium carbonate particles.

In some embodiments the sacrificial material 211 can comprise about 15 wt. % to about 40 wt. % polymeric matrix, about 30 wt. % to about 80 wt. % oxidizing agent, up to about 5 wt. % or up to about 10 wt. % catalyst. Such a sacrificial material 211 can optionally further include one or more of up to about 20 wt. % unoxidized metal powder particles, up to about 40 v. % (i.e., up to about 1 wt. %) flammable gas-filled polymeric bubbles, up to about 50 wt. % inert particles, and up to about 20 wt. % burn rate suppressants.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that cannot be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A method for forming a sealed composite component comprising a sealed bi-material interface, the method comprising:
 applying a sacrificial material to a surface of a substrate;
 over-molding the substrate and the sacrificial material with an over-molding material such that the over-molding material covers at least a portion of the sacrificial material and at least one surface of the substrate;

removing the sacrificial material by deflagration to form a composite component with a channel between the substrate and the over-molding material;

introducing an uncured sealant into the channel; and curing the sealant to form the sealed composite component.

2. The method of claim 1, wherein a gap forms between the substrate and the over-molding material during or after the over-molding material cures and introducing the uncured sealant into the channel further includes introducing the uncured sealant into a least a portion of the gap.

3. The method of claim 1, wherein the substrate comprises a first material having a first coefficient of linear thermal expansion (CLTE) and the over-molding material has a second CLTE which is different from the first CLTE.

4. The method of claim 3, wherein the second CLTE is higher than the first CLTE.

5. The method of claim 3, wherein the second CLTE is at least 10% higher or lower than the first CLTE.

6. The method of claim 1, further comprising, subsequent to introducing sealant into the channel and prior to the sealant fully curing, removing a portion of the sealant introduced into the channel via pressurized gas.

7. The method of claim 1, wherein the sealed composite component comprises a passage extending between the substrate and the over-molding material, and the channel at least partially encircles a cross-section of the passage.

8. The method of claim 1, wherein the substrate comprises one or more of a metal, a polymer, a polymer composite, a ceramic, or a continuous fiber composite material.

9. The method of claim 1, wherein the over-molding material comprises a cast metal.

10. The method of claim 1, wherein the over-molding material comprises a polymer, a polymer composite, or a continuous fiber composite material.

11. The method of claim 1, wherein the over-molding material comprises a polymeric material.

12. The method of claim 1, wherein the sealant comprises one or more silicones, one or more polyurethanes, one or more acrylates, one or more epoxies, and combinations thereof.

13. The method of claim 1, wherein the substrate comprises a metal and the over-molding material comprises a polymeric material.

14. The method of claim 1, wherein the substrate comprises iron or steel and the over-molding material comprises cast aluminum or cast magnesium.

15. The method of claim 1, wherein the substrate comprises a ceramic material and the over-molding material comprises a polymeric material.

16. The method of claim 1, wherein the substrate comprises a cylinder liner and the over-molding material comprises an engine block.

17. A method for forming a sealed composite component comprising a sealed bi-material interface, the method comprising:

applying a sacrificial material to a surface of a substrate including a metal automotive component case;

over-molding the substrate and the sacrificial material with an over-molding material such that the over-molding material covers at least a portion of the sacrificial material and at least one surface of the substrate, wherein the over-molding material comprises a polymer, a polymer composite, or a continuous fiber composite material;

removing the sacrificial material by deflagration to form a composite component with a channel between the substrate and the over-molding material;

introducing an uncured sealant into the channel; and curing the sealant to form the sealed composite component.

18. The method of claim 17, wherein the sealed composite component further comprises one or more cooling passages extending between the metal automotive component case and the over-molding material.

19. The method of claim 17, wherein the automotive component case is a drive unit case.

20. The method of claim 17, wherein the automotive component case is a stator housing.

* * * * *